F. W. PARKS.
CONTROLLER FOR HUMIDIFIERS.
APPLICATION FILED OCT. 27, 1913.
1,234,077.
Patented July 17, 1917.
2 SHEETS—SHEET 1.
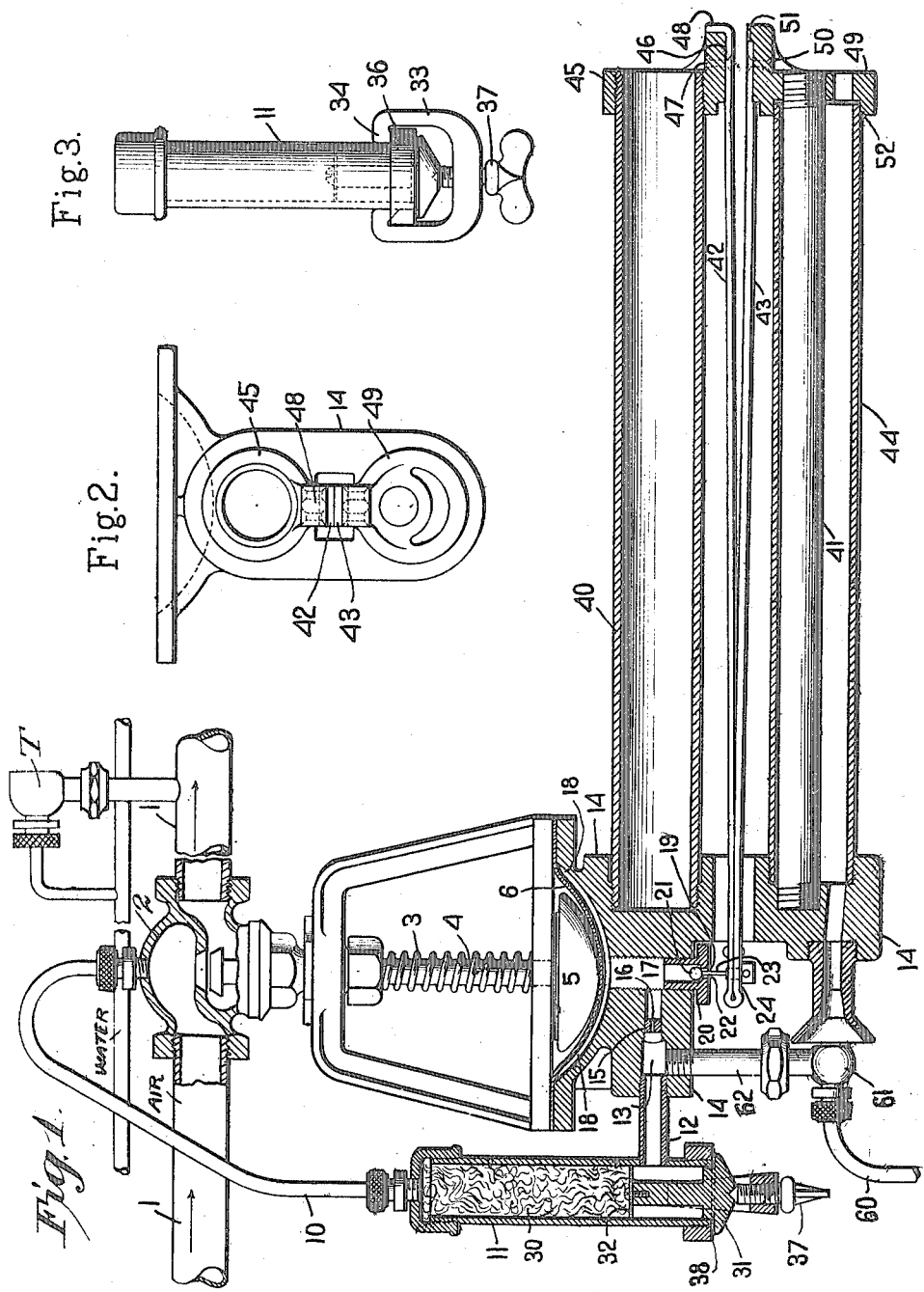
Witnesses.
J. Morrill Fuller
William E. Gagen
Inventor.
Frederick W. Parks,
by Heard Smith & Tennant
Atty's.

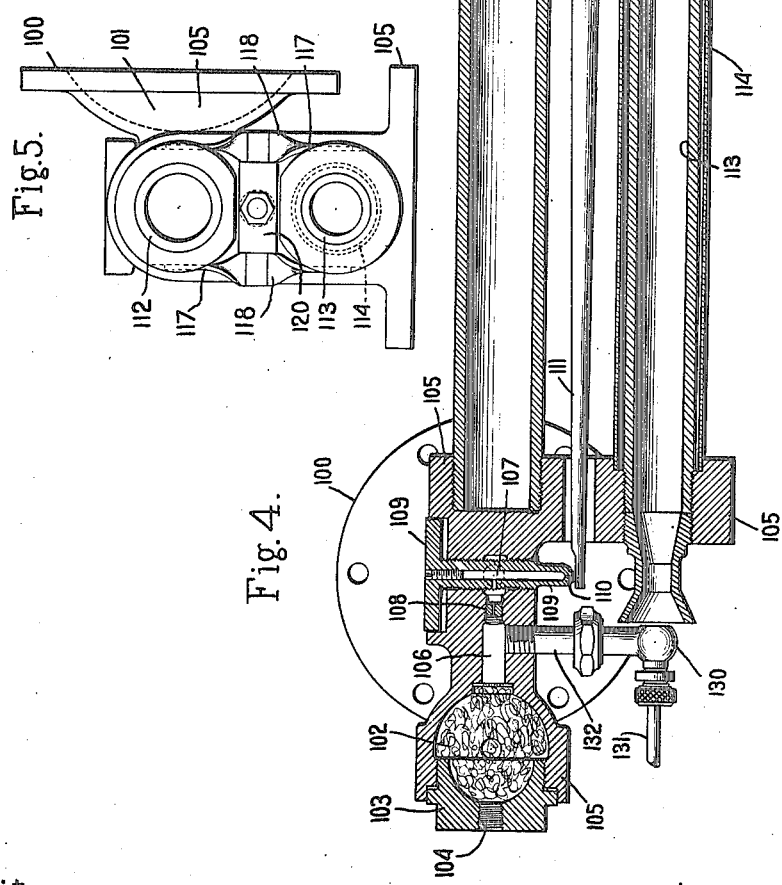

UNITED STATES PATENT OFFICE.

FREDERICK W. PARKS, OF FITCHBURG, MASSACHUSETTS, ASSIGNOR TO THE G. M. PARKS COMPANY, OF FITCHBURG, MASSACHUSETTS, A CORPORATION OF MASSACHUSETTS.

CONTROLLER FOR HUMIDIFIERS.

1,234,077.          Specification of Letters Patent.      Patented July 17, 1917.

Application filed October 27, 1913. Serial No. 797,435.

*To all whom it may concern:*

Be it known that I, FREDERICK W. PARKS, a citizen of the United States, and residing at Fitchburg, county of Worcester, and State of Massachusetts, have invented an Improvement in Controllers for Humidifiers, of which the following description, in connection with the accompanying drawing, is a specification, like characters on the drawing representing like parts.

This invention relates to improvements in controllers for humidifiers or humidifying systems which are adapted to maintain in the air of a room a constant amount of moisture or humidity at a certain selected temperature.

It relates particularly to means for controlling the amount of moisture supplied to the atmosphere in humidifiers of the type in which water is atomized and distributed directly to a room from the supply pipes, although it may be used to control other humidifiers, such as those in which the water is supplied from a reservoir to the moistening devices and the drip or waste from the latter returned to the reservoir.

In the type of humidifiers last mentioned moisture is supplied to the air of the room by passing a current of outside air or of room air or both through a spray or curtain of water thence through an eliminator to precipitate the excess of moisture and thence to the room to be humidified, heating or "tempering" devices being in some instances placed in the path of the current of air to maintain it at the desired temperature. In such devices the quantity of water used is far in excess of that necesary to supply the required amount of humidity to the air and this excess of water is ordinarily returned to the supply tank and repeatedly used. As a consequence the water soon becomes polluted by dust, lint, and germs absorbed from the air of the room during its repeated passage through the humidifier so that after the humidifier has been operating for a time the air in the neighborhood of the humidifier contains a larger percentage of harmful germs than the normal air of the room as appears from the *Report of the Massachusetts State Board of Health* published July, 1913, p. 298. By supplying moisture directly to the atmosphere from the supply pipe and so regulating the supply as to deliver only the amount of water necessary to maintain the air of the room at the desired relative humidity the accumulation of harmful germs in the vicinity of the humidifier is avoided and no substantial amount of water is wasted. The latter is a matter of considerable importance, especially in mills located in climates having a dry season in which the streams of water often fail and also in factories in which the water is metered and payment made for the actual amount consumed.

It is desirable, and in fact necessary, that the regulating device used in a system in which the moisture is supplied directly to the room shall be sensitive to a small change in the relative humidity of the room, that it shall be accurate and reliable, and shall be of such a character that it will not be likely to become clogged with dust, lint, etc. or if it does in time become dirty that it may be readily cleaned.

It is desirable that the number of pipes and other apparatus forming parts of the humidifier equipment be reduced as much as possible. In the construction disclosed herein this is accomplished by supplying the moisture to the air through turbo heads, which will hereinafter be more fully described and by utilizing the fluid pressure medium which operates said turbo heads to actuate the controller for said heads and also to actuate the means which maintains the wet element of the controller at its psychrometric wet bulb temperature.

In the apparatus herein described the controlling mechanism is operated to regulate the force of the operating medium, although it is to be understood that the invention is not limited to the regulation of the operating medium but may also be utilized to regulate the supply of moisture or may regulate the amount of air which is introduced to the room from outside, or the temperature of the room.

I am aware that heretofore humidity controllers have been produced in which the humidity of the atmosphere was regulated through mechanism operated by the difference in expansion and contraction of a wet and dry member, but I am not aware of the production of any instrument or device in which a wet element other than a thermometer was maintained at its psychrometric wet bulb temperature by being placed within the path of a current of saturated air moving at a velocity corresponding to the velocity with which the Sling thermometer is required to travel to give the psychrometric wet bulb temperature of the atmosphere. The rate of movement of such Sling thermometer is 15 feet per second.

One object of the invention is to provide a regulating device comprising two expansible elements, a wet member and a dry member in which the wet member is constantly maintained at its psychrometric wet bulb temperature by reason of its direct contact with a volume of saturated air, and in which the relative humidity of the atmosphere may be controlled for any given temperature within reasonable limits by the difference in expansion and contraction of the wet and dry elements.

Another object of the invention is to provide a humidity controller which is operated by the same motive force as that which operates the humidifier itself, thereby eliminating unnecessary pipes, wiring, and other forms of apparatus from the room in which the humidifier or humidifiers are located.

Another object of the invention is to utilize the same motive force as that which operates the humidifiers to induce and supply a current of saturated air to the wet element to maintain it at substantially the absolute psychrometric wet bulb temperature of the air.

Another object of the invention is to provide means for insulating the wet element from the influence of the surrounding atmosphere so that substantially an absolute wet bulb temperature may be maintained.

Another of the objects of this invention is to provide a simple and effective controlling device which will not be likely to become clogged up with dust or fibers floating in the air, and which can be easily cleaned by an inexperienced man without damage to the instrument.

Other objects of my invention will more fully appear from the accompanying description and drawings and will be particularly pointed out in the following claims.

In the drawings:

Figure 1 is a front elevation partly in section of an apparatus embodying my invention.

Fig. 2 is an end view of the expansible element showing the controlling lever operated thereby and the manner in which it is secured to said element.

Fig. 3 is a detail view of the filter used in connection with my invention and illustrates the manner in which the head of the filter is detachably secured to permit replacement of the filtering material.

Fig. 4 is a vertical sectional view of another of the preferred embodiments of my invention, and Fig. 5 is an end view of the same.

The embodiments of my invention illustrated herein are shown as applied to a humidifier system in which the moisture is delivered to and distributed in a room, such as a room of a cotton mill or a silk mill by a water pipe having a jet pipe or jet pipes terminating in vaporizing devices operated by a current of compressed air directed into the head or nozzle of the spray pipe, and which serves to induce a flow of water proportionately to the amount of the pressure of the escaping compressed air.

The particular type of nozzle which is used in connection with my invention is a "turbo head" of the type which forms the subject matter of Patent No. 869,945 granted Nov. 5, 1907 to Albert W. Thompson and of my Patent No. 968,074 granted Aug. 23, 1910, and also of my application for Patent No. 787,382 filed Aug. 29, 1913. In this type of humidifier the vaporizer comprises a head T having a circular chamber provided with a tangential nozzle for the admission of compressed air or steam under pressure, with an axial outlet at one end of the chamber and at its other end a water discharge nozzle extending coaxially into said chamber. In such a device the nozzle is connected with a source of water supply, the water being at substantially atmospheric pressure and the action of the compressed air, or steam under pressure, serves to break up and vaporize the particles of water in the circular chamber of the head, resulting in a jet of vapor issuing from the axial outlet of the chamber with sufficient force to produce a current of air which will distribute the moisture throughout the room.

In Fig. 1 of the drawings the compressed air pipe leading to such a humidifier is indicated by the pipe 1 through which compressed air or steam flows in the direction designated by the arrows. In front of the humidifier head T of a series of heads a motor operated valve 2 is provided, in which the valve is adapted to be forced open, from its seat, by a spring 3 surrounding the stem 4 of the valve and abutting upon a plate 5 secured to the valve stem at its end. In the operation of the machine, however, the valve 2 is closed by a diaphragm 6 which is pressed against the member 5, to raise the valve against the action of the spring, by compressed air introduced beneath said diaphragm, preferably through a by-pass leading from the compressed air pipe in advance of said valve 2.

It will be obvious that when sufficient pressure is applied through the by-pass beneath the diaphragm 6 the valve 2 will be raised against the tension of its spring and the compressed air or steam which is supplied to the humidifiers will be shut off whereas if the amount of pressure in the by-pass is reduced the spring will force the valve from its seat, and more compressed air or steam will be supplied through the pipe 1 to the turbo heads.

The mechanism for operating the valve 2 as illustrated in Fig. 1 comprises a pipe or by-pass 10 leading from a point in the main air pipe in advance of the valve 2 through a filter 11, which serves to remove any solid impurities, thence through a conduit to a chamber beneath the diaphragm which actuates the valve 2. The conduit comprises a pipe 12 and communicating passages 13 and 17 in a casting 14 which forms a support for the regulating apparatus. The passage 13 is provided with a plug 15 having a relatively small opening 16 adapted to restrict the amount of the compressed air which is introduced beneath the diaphragm to that necessary to properly operate the valve. The passage 13 terminates in a transverse aperture or passage 17 which leads to the chamber 18 beneath the diaphragm 6.

The amount of pressure maintained in the chamber 18 beneath the diaphragm 6 to actuate the diaphragm is regulated by a valve 19 preferably located in the mouth of the passage 17. This valve as illustrated in Fig. 1 is adjustably arranged and comprises a hollow member 20 which is screw-threaded into the end of the passage 17, said member having a ball 21 supported within the hollow chamber thereof and adapted to normally close an axial opening 22 therein. The ball is adapted to be raised from its seat by a pin 23 extending through said axial opening and resting upon the end of a lever 24 which is connected to the outer ends of the expansible wet and dry elements as will be hereinafter described.

It will be obvious that by adjusting the screw threaded member 20 upwardly or downwardly the amount of movement of the lever necessary to open and close the valve will be varied and suitable regulation thereby provided for controlling the degree of humidity at different temperatures.

The air supplied through the by-pass to the chamber beneath the diaphragm 6 is freed from dust and other impurities by passing through the filter 11, which as illustrated in the drawings, comprises a cylindrical chamber, in which a suitable amount of absorbent cotton 30 or other filtering material is held in place by a detachable plug 31 provided at its end with a screen 32 which is adapted to press against the absorbent material but which permits the air to escape without interference into the pipe 12. The plug 31 is retained in place by means of a U-shaped yoke 33 having inturned feet or claws 34 which pass over a collar 36 screwed on otherwise suitably secured upon the end of the cylindrical filter chamber 11, the yoke 33 being provided with a thumb screw 37 adapted to press upon the outer end of the plug 31 to secure the same firmly in place. If desired a washer or suitable packing 38 may be placed between the plug 31 and the end of the cylinder 11 to provide an air tight joint.

The means for operating the lever 24 and thereby controlling the pressure of the compressed air in the chamber 18 beneath the diaphragm 6 comprises a pair of expansible members 40 and 41 each of which is rigidly secured at one end to the casting 14 and preferably projects horizontally therefrom. The outer free ends of the members 40—41 are each connected rigidly to branches 42 and 43 of a lever 24 so that the lever 24 will be oscillated to open or close the valve by the unequal contraction or expansion of said expansible members. The expansible member 40 is, in the particular form illustrated in Figs. 1—2 of the drawings, a brass tube, while the member 41 (as shown in these figures) is a brass rod, preferably inclosed within a brass tube 44 through which saturated air is delivered to maintain the rod at its psychrometric wet bulb temperature, and to prevent the surrounding atmosphere from interfering with the accurate operation of the humidifier controller.

The outer end of the brass tube 40, which will hereafter be designated as the dry element, is provided with a collar 45 which has a flattened projection 46, to which the end of the branch 42 of lever 24 is secured by a rivet 47, or other suitable fastening, said branch 42 preferably being upturned at its end 48 to embrace said collar and afford a more rigid connection between the collar 45 and the branch 42. The rod 41, which will be hereafter designated as the wet element is likewise screw threaded at its end and is provided with a collar 49 to which the branch 43 of the lever 24 is rigidly secured by a rivet 50 or other suitable fastening. Inasmuch as the branch 43 of the lever 24 is subjected to compression rather than tension a shoulder 51 is provided upon the collar 40 against which the end of the branch 42 abuts.

The collar 49 is provided at its inner face with a groove 52 which serves to support the end of a tube 44 which protects the wet element, said end being slidably mounted in said groove so as not to interfere with the expansion and contraction of the wet element.

In order to maintain the wet member at its psychrometric wet bulb temperature means are provided for supplying a current of saturated air to envelop the surface of the member 41 to maintain it constantly in a wet state, said current of air being substantially a velocity of 15 ft. per second, which is the velocity of the movement of a Sling thermometer, to cause the wet element to be maintained at its psychrometric wet bulb temperature. Any suitable means for supplying such a current of saturated air may be provided. However, in the particular construction illustrated in Fig. 1 the water is supplied through a pipe 60 which leads to a turbo head 61, such as that above described, and which is in effect an auxiliary humidifier, the compressed air being supplied to said head through a pipe 62 leading from the passage 13 in advance of the restricting plug 16. By this arrangement the same motive power is used to induce and supply a current of saturated air to the wet bulb member as is used to supply humidified air to the room through the humidifier or humidifiers operated by the compressed air from the main pipe 1, and also this same motive power is utilized for shutting off the humidifiers.

In the operation of the device disclosed herein a constant current of saturated air is induced and caused to pass over and around the wet element 41 and by reason of the fact that this current of air is maintained at substantially constant speed of 15 ft. per second the wet element is maintained at its psychrometric wet bulb temperature. The dry expansible element 40 is exposed to the atmosphere of the room and expands or contracts with the variations in temperature therein. The differential expansion of these two members serves to oscillate the lever 24 through its branches 42—43, which are connected to the ends of said expansible members, and the oscillation of said lever raises or lowers the ball 21 to open and close the opening or port 22 thus controlling the pressure in chamber 18 beneath the diaphragm 16, and consequently opening or closing the valve 2 and thereby turning on or off the compressed air fluid which is supplied to the humidifier and humidifiers of the room. It is found in practice that this apparatus works with exceeding accuracy, a change of temperature due to a change in relative humidity from ¼ to ⅓ of a degree in the air of the room being sufficient to cause the actuating of the controlling valve.

In Figs. 4 and 5 I have shown a simplified and preferred form of controller. This controller like that illustrated in Figs. 1 and 2 is provided with a motor valve operated by a diaphragm, which is not illustrated, but the cover 100 for which is shown in Fig. 4 with a chamber 101 corresponding to the chamber 18 of the device illustrated in Fig. 1.

The compressed air is supplied to the chamber 101 through a by-pass from the main compressed air pipe, said by-pass leading into a filter chamber 102, which as illustrated in the drawing is substantially spherical in form and is provided with a removable cap or plug 103 having an aperture 104 into which the by-pass pipe leading from the main air pipe terminates. The filter chamber is preferably formed in an extension of the casting 105 which serves to support the various parts of the regulating device.

A passage 106 for the compressed air leads from the filter to a transverse passage 107 leading to the chamber 101 beneath the diaphragm valve, said passage 106 being provided with a restricting plug 108 having a small orifice such as that above described in reference to the construction shown in Fig. 1. The relief valve in this construction consists of a screw threaded member 109 which passes through the casting 105 intersecting both passages 106 and 107. The member 109 preferably comprises a screw threaded stem bored longitudinally but terminating in a smaller or restricted opening 110 serving as a relief port which may be opened or closed by the end of a lever 111 operated by the relative expansion or contraction of the wet and dry members as will hereinafter be more fully described. The other end of the bore is preferably closed by a removable screw threaded plug. By such a construction the port 110 may be opened and closed by the direct action of the lever or if a reverse operation is desired the member 109 may be raised out of contact with the lever and a ball and stem inserted through said bore to form a valve like that illustrated in Fig. 1. The head of the member 109 is preferably made in the form of a disk and is graduated to indicate the proper adjustment of said member to supply the desired amount of humidity at a given temperature of the atmosphere.

The means for operating the lever 111 comprise the dry element 112 which is preferably tubular in form and is secured rigidly at one end to the casting 105 and at its outer or free end to the lever 111, and the wet member 113 which is likewise in the form of a tube and is secured at one end to the casting 105 and at its free end to the lever 111. The wet member 113 may, if desired, be provided with a protecting casing 114 to insulate the wet element from the influence of the surrounding air of the room. The wet and dry members used in connection with my preferred form of invention are usually of brass and have the same coefficient of expansion.

The free ends of the members 112—113 are provided with collars 115—116, said collars having flattened lateral faces to which are attached a pair of twisted straps 117. The intermediate portion of said straps 118 lying between the members 112—113 being at right angles to the direction in which said members extend. The lever 111 is rigidly attached to a cross piece 120 which in turn is secured to the transverse portions 118 of the straps 117.

It will thus be obvious that a difference in the expansion of the members 112—113 will cause an oscillation of the lever 111 and that its end will contact with or be removed from the seat 110 at the end of the adjustable member 109 thus acting as a valve to control the amount of pressure in the chamber 101 beneath the diaphragm valve in the same manner as was described in the apparatus illustrated in Figs. 1 and 2.

Saturated air may be supplied to the wet member in this my preferred form of apparatus through a turbo head 130 having a water pipe 131 extending axially into the same, and is supplied with compressed air or steam through a pipe 132 leading from the passage 106. This turbo head induces a current of room air and saturates it at the same time and in the apparatus illustrated in Fig. 4 said current of air is caused to pass through the interior of the cylindrical wet member, thus causing the interior surface thereof to be kept wet, and by reason of the fact that the current thus supplied moves at substantially the rate of 15 ft. per second, the wet element is maintained at the psychrometric wet bulb temperature of the air. Other means, however, may be used for obtaining this wet bulb temperature. It is to be observed that in each of the embodiments of my invention disclosed herein the entire apparatus may be located in the room which is to be humidified so that the atmosphere which affects the dry and wet bulb respectively is the atmosphere of such room which by reason of its normal temperature causes the expansion and contraction of the dry member 112, and by reason of its saturation maintains the wet member at the psychrometric wet bulb temperature.

It will also be noted that the cylindrical wet and dry elements are easily accessible and may be cleaned readily by a cloth or swab or by a jet of compressed air, inasmuch as the dry member is open at one end and the wet member at both ends.

If it is found necessary because of an unusual amount of dust or lint in a room a screen may be provided either to surround the entire regulating device or such portions thereof as it is found necessary to keep from deposits of dust, etc.

It is to be understood that while I have described this invention as particularly applicable to a direct moisture supplying system, it may be used also in connection with other systems of humidifiers and may be arranged to control either the operating medium, the water supply or the air supply to the room or to regulate the temperature of the room by the use of any suitable mechanism for controlling the heating plant or a radiating system.

Having thus described my invention, what I claim as new and desire to secure by Letters Patent is:

1. In combination with a humidifying apparatus comprising water supplying means and means for supplying a motive fluid for vaporizing said water, controlling mechanism including wet and dry bulb elements and means connected to said motive fluid supply and actuated thereby for maintaining said wet bulb element at the psychrometric wet bulb temperature of the atmosphere.

2. In combination with a humidifying apparatus comprising water supplying means and means for supplying a motive fluid for vaporizing said water and distributing the vapor, controlling mechanism for the motive fluid including wet and dry bulb elements and means connected to said motive fluid supply and actuated thereby for continuously supplying to said wet bulb element a current of saturated air moving with sufficient rapidity to maintain said wet bulb element at the psychrometric wet bulb temperature of the atmosphere.

3. In combination with a humidifying apparatus comprising a vaporizing device, means for supplying water thereto and means for supplying a fluid under pressure to actuate said vaporizer, a controller including wet and dry bulb expansible elements, means connected to said motive fluid supply and actuated thereby to supply a current of moisture saturated air to said wet bulb element and means also actuated by said pressure fluid and regulated by the differential expansion of the wet and dry bulb elements to control the motive fluid supplied to said vaporizer.

4. In combination with a humidifying apparatus comprising a vaporizing device, means for supplying water thereto, a compressed air conduit leading to said vaporizing device for vaporizing the water and distributing the vapor, regulating means for controlling the supply of compressed air to said vaporizing device comprising expansible elements subject to the wet and dry bulb temperatures of the air, a valve in said compressed air conduit having a diaphragm motor supplied with compressed air from said air conduit and means actuated by the differential expansion of said wet and dry bulb elements for regulating the pressure of the air in said motor.

5. A humidifier controller having a motor valve, means for actuating the same comprising a diaphragm, a compressed air chamber beneath the same, a relief passage leading from said compressed air chamber, a relief valve in said passage, parallel wet and dry bulb expansible elements each immovably secured at one end, a lever rigidly secured to both said elements at the opposite end and adapted to be oscillated by the differential expansion of said elements to open and close said relief valve.

6. A humidifier controller having a valve and means for operating the same comprising two parallel expansible elements subject respectively to the wet and dry bulb temperatures of the atmosphere, a lever located intermediate of said elements and disposed in operative relation to said valve and having branches connected respectively to said wet and dry bulb expansible elements whereby the movement of said branches caused by the differential expansion of said wet and dry bulb elements resulting from changes in relative humidity of the atmosphere, will cause said lever to open and close said valve.

7. In combination with a humidifying apparatus comprising a vaporizing device, means for supplying the same with water, means including a conduit for supplying a motive fluid to said vaporizing device for vaporizing said water and distributing the vapor, a valve in said conduit, wet and dry bulb expansible elements, means actuated by their differential expansion to operate said valve and means for inducing a current of air from the immediate vicinity of the controller, saturating and delivering the same to the surface of said wet bulb element to maintain the same at its psychrometric wet bulb temperature.

8. In combination with a humidifying apparatus comprising a vaporizing device, means for supplying the same with water, means including a conduit for supplying a motive fluid to said vaporizing device for vaporizing said water and distributing the vapor, a valve in said conduit, wet and dry bulb members having the same co-efficients of expansion, a lever connected to both of said elements and adapted to be oscillated by the joint action thereof when expanded unequally to actuate said valve, means to induce a current of air taken from the atmosphere immediately surrounding the controller, to saturate and deliver the same into contact with said wet bulb element at a velocity sufficient to maintain said element at the psychrometric wet bulb temperature of the atmosphere.

9. In combination with a humidifying apparatus comprising a vaporizing device, means for supplying the same with water, means including a conduit for supplying a motive fluid to said vaporizing device for vaporizing said water and distributing the vapor, a valve in said conduit, wet and dry bulb members having the same co-efficients of expansion, a lever connected to both of said elements and adapted to be oscillated by the joint action thereof when expanded unequally to actuate said valve, means to induce a current of air taken from the atmosphere immediately surrounding the controller, to saturate and deliver the same into contact with said wet bulb element at a velocity sufficient to maintain said element at the psychrometric wet bulb temperature of the atmosphere, and insulating means surrounding said element to protect the same from the influence of the atmosphere which envelops the controller.

10. A humidifier controller comprising a valve and means for actuating the same including wet and dry bulb expansible elements, a lever directly and rigidly connected to both of said elements and adapted to be oscillated by their differential expansion, means for maintaining a current of saturated air in contact with the surface of the wet bulb element and for causing said current to flow at a velocity which will maintain the element at the psychrometric wet bulb temperature of the atmosphere.

11. A humidifier controller comprising a valve and means for actuating the same including a diaphragm, a compressed air chamber beneath the same, a relief passage leading from said compressed air chamber, a relief valve for said passage, wet and dry bulb expansible members each immovably secured at one end, a lever rigidly secured to both said elements at the opposite end and adapted to be oscillated by the differential expansion of said elements to open and close said relief valve and means for adjusting said relief valve whereby a predetermined humidity of the atmosphere at different temperatures may be maintained.

12. A humidifier controller comprising a valve, wet and dry bulb expansible elements and means actuated by the differential expansion of said elements to open and close said valve, means for supplying moisture to the inner surface of said wet bulb element consisting of a vaporizing device located adjacent to one end of said element and adapted to induce a current of air from the immediate vicinity of the controller to saturate the same and deliver the saturated air to the inner surface of said wet bulb member at substantially the psychrometric wet bulb temperature of the atmosphere.

13. A humidifier controller comprising tubular wet and dry bulb expansible elements arranged in parallelism and adjacent each other, the wet bulb expansible element being open at both ends, a vaporizer located adjacent to one end of said wet bulb element and means for actuating said vaporizer to induce a current of air from the atmosphere immediately surrounding the controller to saturate the same and to force it through the interior of the wet bulb element at a sufficient rate of speed to maintain the inner surface of said element at substantially the psychrometric wet bulb temperature of the atmosphere and means actuated by the differential expansion of said wet and dry bulb elements to regulate the action of the humidifier.

14. In a humidifying system comprising a vaporizing device, a water supply therefor, a conduit for supplying a fluid under pressure to said vaporizing device to vaporize said water and distribute the same, a valve in said conduit, a motor for said valve including a casing having a chamber, a diaphragm covering said chamber and operatively connected to said valve, a by-pass leading from said fluid supply conduit to said chamber beneath said diaphragm, a relief passage for said chamber, a valve in said relief passage, wet and dry bulb elements connected to said casing arranged in parallelism, means for maintaining said wet bulb element at the psychrometric wet bulb temperature of the surrounding atmosphere and means operated by the differential expansion of said elements to open and close said relief valve and thereby to control the valve in the fluid supply conduit.

15. In a humidifier system comprising a vaporizing device, a water supply therefor, a conduit for supplying a fluid under pressure to said vaporizing device to vaporize said water and distribute the same, a valve in said conduit, a motor for said valve including a casing having a chamber, a diaphragm covering said chamber and operatively connected to said valve, a by-pass leading from said fluid supply conduit to said chamber beneath said diaphragm, means for filtering the air supplied through said by-pass, a relief passage for said chamber, a valve in said relief passage, wet and dry bulb elements connected to said casing arranged in parallelism, means for maintaining said wet bulb element at the psychrometric wet bulb temperature of the surrounding atmosphere and means operated by the differential expansion of said elements to open and close said relief valve and thereby to control the valve in the fluid supply conduit.

16. In a humidifying system comprising a vaporizing device, a water supply therefor, a conduit for supplying a fluid under pressure to said vaporizing device to vaporize said water and distribute the same, a valve in said conduit, a motor for said valve including a casing having a chamber, a diaphragm covering said chamber and operatively connected to said valve, a by-pass leading from said fluid supply conduit to said chamber beneath said diaphragm, means for filtering the air supplied through said by-pass, a relief passage for said chamber, a valve in said relief passage, wet and dry bulb elements connected to said casing arranged in parallelism, a vaporizer having a water supply and an air conduit communicating with said by-pass, said vaporizer being located adjacent to the end of said wet bulb element and adapted to induce a current of air to saturate the same and deliver the saturated air to said wet bulb element and means operating by the differential expansion of said elements to open and close the valve in said relief passage and thereby to control the valve in said fluid supply conduit.

17. In a humidifying system comprising a vaporizing device, a water supply therefor, a conduit for supplying a fluid under pressure to said vaporizing device to vaporize said water and distribute the same, a valve in said conduit, a motor for said valve including a casing having a chamber, a diaphragm covering said chamber and operatively connected to said valve, a by-pass leading from said fluid supply conduit to said chamber beneath said diaphragm, means for filtering the air supplied through said by-pass, a relief passage for said chamber, an adjustable valve seat in said relief passage, a valve in said valve seat, wet and dry bulb elements connected to said casing arranged in parallelism, a vaporizer having a water supply and an air conduit communicating with said by-pass, said vaporizer being located adjacent to the end of said wet bulb element and adapted to induce a current of air to saturate the same and deliver the saturated air to said wet bulb element and means operating by the differential expansion of said elements to open and close the valve in said relief passage and thereby to control the valve in said fluid supply conduit.

18. In a humidifying system comprising a vaporizing device, a water supply therefor, a conduit for supplying a fluid under pressure to said vaporizing device to vaporize said water and distribute the same, a valve in said conduit, a motor for said valve including a casing having a chamber, a diaphragm covering said chamber and operatively connected to said valve, a by-pass leading from said fluid supply conduit to said chamber beneath said diaphragm, a relief passage for said chamber, a valve in said relief passage, wet and dry bulb elements connected to said casing arranged in parallelism, a vaporizer having a water supply and an air conduit communicating with said by-pass, said vaporizer being located adjacent to the end of said wet bulb element and adapted to induce a current of air to saturate the same and deliver the saturated air to said wet bulb element, means located between said wet and dry bulb elements and connected to the free ends thereof and operable by the differential expansion of said elements to actuate said relief valve and thereby to control the valve in said fluid supply conduit.

19. A motor operable by variations of the condition of humidity of the atmosphere comprising a stand having a recess, a diaphragm covering the same to form a chamber, power transmitting means adapted to be operated by the movement of said diaphragm, a conduit leading to said chamber, means for supplying a fluid under pressure to said conduit, a relief passage communicating with said chamber, a valve in said relief passage, wet and dry bulb expansible members rigidly secured at one end to said stand and arranged in parallelism, means for supplying saturated air to said wet bulb element and means connected to the free end of said wet and dry bulb elements and operable by the differential expansion thereof to actuate said relief valve.

20. A motor operable by variations of the condition of humidity of the atmosphere comprising a stand having a recess, a diaphragm covering the same to form a chamber, power transmitting means adapted to be operated by the movement of said diaphragm, a conduit leading to said chamber, means for supplying a fluid under pressure to said conduit, a relief passage communicating with said chamber, a valve in said relief passage, wet and dry bulb expansible members rigidly secured at one end to said stand and arranged in parallelism, means for supplying saturated air to said wet bulb element, means connected to the free end of said wet and dry bulb elements and operable by the differential expansion thereof to actuate said relief valve, and means for adjusting said valve whereby the action of the motor may be varied for different desired conditions of humidity.

21. A motor operable by variations of the difference of the atmosphere comprising a stand having a recess, a diaphragm covering the same to form a chamber, a power transmitting means adapted to be operated by the movement of said diaphragm, a conduit leading to said chamber, means for supplying the fluid under pressure to said chamber through said conduit, a relief passage communicating with said chamber, wet and dry bulb members rigidly secured to said stand and arranged in parallelism, a lever connected to the free ends of said wet and dry bulb elements and disposed intermediate of said elements and extending into operative relation to said valve, means for supplying said wet bulb elements with saturated air moving at a sufficient speed to maintain said wet bulb element at substantially the psychrometric wet bulb temperature of the atmosphere.

22. A motor operable by variations of the condition of the atmosphere comprising a stand having a recess, a diaphragm covering the same to form a chamber, a conduit leading to said chamber, means for supplying air under pressure to said conduit, means within said conduit for absorbing the dust and moisture from the air passing therethrough, a restricting block in said conduit, a relief passage leading from said chamber, a valve in said passage, wet and dry bulb elements rigidly secured at one end to said stand and a lever rigidly secured to the free ends of said elements and coöperatively engaging said valve.

23. A motor operable by variations of the conditions of the atmosphere comprising a stand having a recess, a diaphragm covering the same to form a chamber, a conduit leading to said chamber, means within said conduit for absorbing dust and moisture from the air supplied through said conduit, means adapted to permit the removal of said absorbing means, a relief passage communicating with said conduit, a valve in said relief passage, wet and dry bulb elements rigidly secured at one end to said stand, means for maintaining the wet bulb element at the psychrometric wet bulb temperature of the atmosphere and means operable by the differential expansion of said wet and dry bulb members for operating said valve.

24. In a humidifying apparatus, a water supply, means for vaporizing the water comprising a conduit for supplying fluid under pressure, a valve in said conduit, a fluid pressure motor operatively connected to said valve, means for supplying fluid under pressure to said motor, regulating means for said motor including expansible elements subject respectively to the wet and dry bulb temperatures of the atmosphere and means operable by their differential expansion to control the supply of fluid under pressure to said motor.

In testimony whereof, I have signed my name to this specification, in the presence of two subscribing witnesses.

FREDERICK W. PARKS.

Witnesses:
ROBERT S. PARKS,
PRISCILLA L. WEISSBACH.